United States Patent
Chiu

(10) Patent No.: US 7,513,431 B2
(45) Date of Patent: Apr. 7, 2009

(54) METHOD AND SYSTEM FOR AIMING AN RFID READER

(75) Inventor: Lihu M. Chiu, Arcadia, CA (US)

(73) Assignee: Printronix, Inc., Irvine, CA (US)

( * ) Notice: Subject to any disclaimer, the term of this patent is extended or adjusted under 35 U.S.C. 154(b) by 375 days.

(21) Appl. No.: 11/073,081

(22) Filed: Mar. 4, 2005

(65) Prior Publication Data
US 2006/0208076 A1    Sep. 21, 2006

(51) Int. Cl.
*G06K 7/10* (2006.01)

(52) U.S. Cl. ............................. 235/472.02; 235/472.01; 235/462.2

(58) Field of Classification Search ............ 235/472.02, 235/472.01, 462.2, 462.21
See application file for complete search history.

(56) References Cited

U.S. PATENT DOCUMENTS

| | | | | |
|---|---|---|---|---|
| 5,598,007 A * | 1/1997 | Bunce et al. | ................. | 250/566 |
| 5,659,167 A * | 8/1997 | Wang et al. | ............. | 235/472.01 |
| 5,874,724 A * | 2/1999 | Cato | ........................... | 235/492 |
| 6,003,773 A * | 12/1999 | Durbin et al. | .......... | 235/462.45 |
| 6,056,199 A * | 5/2000 | Wiklof et al. | .......... | 235/462.45 |
| 6,109,526 A * | 8/2000 | Ohanian et al. | ........ | 235/462.45 |
| 6,330,975 B1 * | 12/2001 | Bunte et al. | ............. | 235/472.01 |
| 6,371,375 B1 * | 4/2002 | Ackley et al. | .......... | 235/462.45 |
| 6,830,181 B1 * | 12/2004 | Bennett | ....................... | 235/440 |
| 6,848,616 B2 * | 2/2005 | Tsirline et al. | .............. | 235/449 |
| 7,121,467 B2 * | 10/2006 | Winter et al. | ............. | 235/462.2 |
| 7,199,719 B2 * | 4/2007 | Steinberg | ................. | 340/572.8 |

\* cited by examiner

*Primary Examiner*—Ahshik Kim
(74) *Attorney, Agent, or Firm*—Haynes & Boone, LLP.

(57) ABSTRACT

A method and system for enhancing the accuracy of RFID tag reading is disclosed. An imaging device is used to facilitate aiming of the RFID tag in a manner that mitigates the likelihood of inadvertently reading a nearby RFID tag instead of the desired tag. In this manner, the utility of the RFID reader is substantially enhanced.

25 Claims, 3 Drawing Sheets

METHOD AND SYSTEM FOR AIMING AN RFID READER

TECHNICAL FIELD

The present invention relates generally to radio frequency identification (RFID). The present invention relates more particularly to a method and system for aiming an RFID reader in a manner that enhances the likelihood of reading a desired RFID tag rather than a nearby RFID tag.

BACKGROUND

RFID tags for identifying goods are well known. They can be applied to either the goods themselves or to packaging for the goods. RFID tags typically comprise an integrated circuit or chip and an antenna coupled to the chip. Information regarding the goods is stored upon the chip. For example, this information can include identification information, manufacturing information (such as what manufacturing processes have already been performed and/or what manufacturing process is to be performed next), customer information, or shipping information. RFID tags can be formed upon labels to facilitate their application to the goods or packaging.

The antenna typically comprises a plurality of conductive traces formed upon a substrate, such as the label. The antenna facilitates communication between the chip and an RFID reader and/or writer. Information is read from an RFID chip by first interrogating the chip with a reader. The reader transmits a signal that is picked up by the antenna and is then communicated to the chip. The chip subsequently responds by communicating a signal to the antenna that is then transmitted to the RFID reader.

The information can be read by either a hand-held RFID reader or a stationary RFID reader. Hand-held RFID readers can be used in warehouses, for example. In a warehouse, an RFID reader can be used to locate a desired item (having an RFID tag) from among many similar items.

Stationary RFID readers can be used in manufacturing processes. For example, they can be used to determine what manufacturing process is to be performed next on an item passing along a conveyor. Thus, an RFID reader can be used to determine what color an item is to be painted or what accessories are to be added thereto. Such information can be used to determine where in a manufacturing plant the item goes next and thus facilitates automation of the manufacturing process.

One problem with contemporary RFID readers is that they tend to be undesirably indiscriminate with regard to which RFID tag is being read. Although they are somewhat directional with respect to how the beam is transmitted therefrom, they are not completely directional. The transmitted beam has some amount of spread and is thus capable of reading other RFID tags that are proximate the desired RFID tag. Generally, if an RFID reader is pointed directly at the desired RFID tag, it is much more likely to read only that particular RFID tag. However, if the RFID reader is slightly off (not well aimed), then it may read a nearby RFID tag instead. Thus, it is sometimes difficult to know which item's RFID tag is being read.

For example, if a person is looking for an item in a warehouse, the RFID reader may indicate the presence of the desired item on a shelf. However, if there are other similar items nearby, then the user may have difficulty determining which of the items is the desired one. As such, it is desirable to provide a way to better aim RFID readers or otherwise determine when they are pointed at a selected RFID tag.

BRIEF SUMMARY

Systems and methods are disclosed herein to provide an RFID reader that is capable of enhanced discrimination among nearby RFID tags. For example, in accordance with an embodiment of the present invention, an RFID reader is combined with an imaging device. The imaging device is configured to facilitate aiming of the RFID reader such that inadvertently obtaining readings from RFID tags other than the desired RFID tag is less likely.

More specifically, in accordance with one embodiment of the present invention an RFID reader has a built-in imaging device and display. The display shows where the RFID reader is pointed, so that it can more accurately be pointed only at a desired RFID tag, while avoiding pointing it at other nearby RFID tags. This embodiment is well suited for hand-held use.

In accordance with another embodiment of the present invention, an RFID reader is associated with an imaging device and machine vision is used to determine when the RFID reader is aimed at a desired RFID tag. In this manner, manufacturing processes are enhanced. This embodiment is well suited for stationary use.

This invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION OF THE PREFERRED EMBODIMENTS

Figure 1:
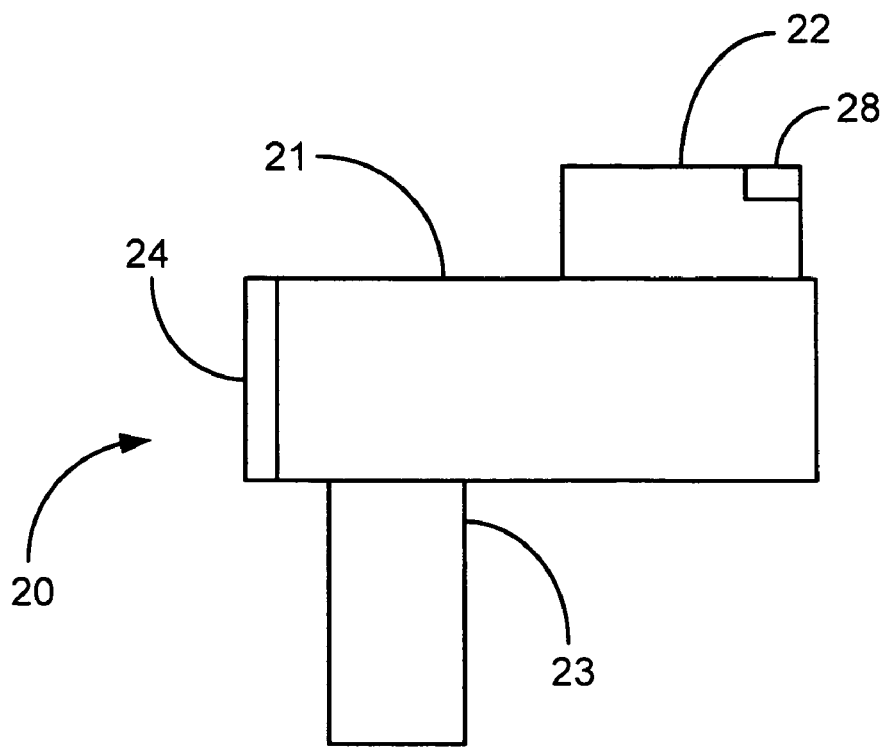
FIG. 1 is a semi-schematic side view of an exemplary hand-held RFID reader, according to one embodiment of the present invention.
Figure 2:
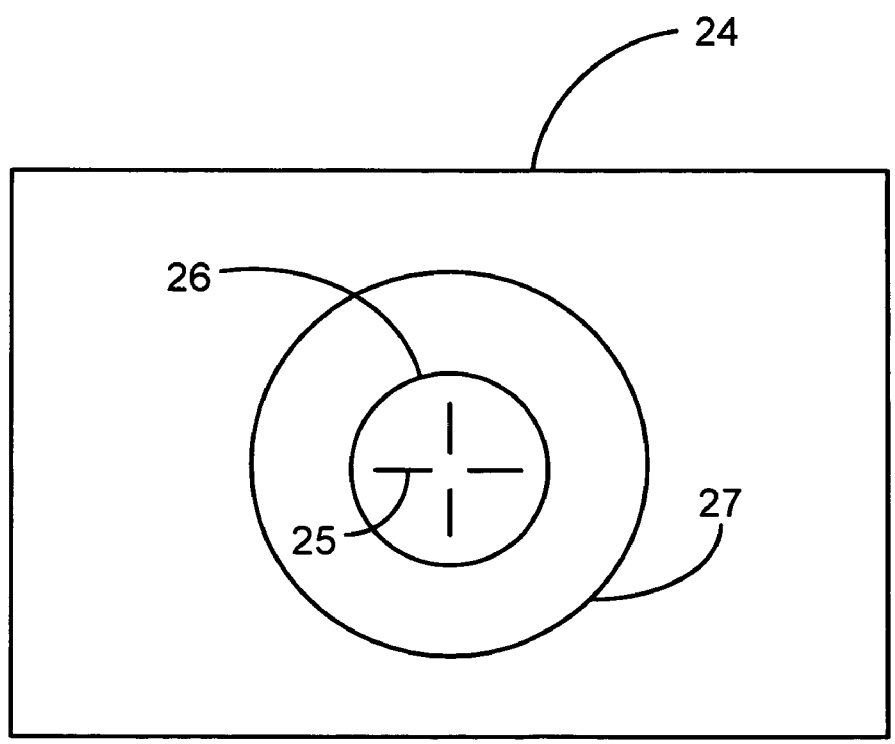
FIG. 2 is enlarged front view of the display of FIG. 1.

One exemplary embodiment of the present invention is illustrated in FIGS. 1 and 2. This exemplary embodiment is a hand-held RFID reader assembly 20 that can be carried by a person and used to identify goods and/or retrieve information relating to the goods. For example, hand-held RFID reader assembly 20 can be carried about a warehouse and used to locate goods that are to be shipped out.

With particular respect to FIG. 1, hand-held RFID reader assembly 20 can comprise a reader 21 having a handle 23 extending downwardly therefrom. An imaging device 22 can be formed to reader 21 such it that images scenes in the direction that the hand-held RFID reader assembly 20 is pointing. A display 24 can be formed to the body such that it is readily viewable by a person holding hand-held RFID reader 20.

Imaging device 22 can be an electronic imaging device, such as a CCD imager. Imaging device 22 provides an output to display 24. Imaging device 22 and display 24 cooperate to define an aiming device for hand-held RFID reader 20. Thus, by viewing display 24, a user can determine what item reader 21 is pointed toward. It is the RFID tag of this item that reader 21 is most likely to read.

Imaging device 22 can alternatively be an all-optical (non-electronic) imaging device. For example, imaging device 22 can be similar to an optical viewfinder device of a film camera.

With particular reference to FIG. 2, display 24 optionally comprises indicia formed thereon to facilitate more accurate aiming of reader 21. For example, display 24 can comprise crosshairs 25 and/or circular bulls eye target which is comprised of concentric circles 26 and 27.

Optionally, the indicia can comprise a gradient, such that display 24 becomes either lighter or darker from the center to the outer edges thereof. For example, a dark dot can be formed at the center of the display (such as between cross hairs 25). The dot can define the center of a gradient that becomes lighter as the gradient is further from the dot.

In each instance, the indicia are used to aim hand-held RFID reader assembly 20 by helping the user to center the desired RFID tag to be read in display 24. Thus, cross-hairs 25 may be placed over the RFID tag and/or the RFID tag may be positioned within inner circle 27. Such aiming of reader 21 helps to assure that hand-held RFID reader assembly 20 is pointed at the desired item and thus tends to mitigate the likelihood of obtaining a reading from a nearby RFID tag.

Optionally, a range finder 28 (FIG. 1) can be used to determine the range from imaging device 22 to the RFID tag to be read. Range finder 28 facilitates the use of indicia that better indicate the likelihood that a desired RFID tag will be read and that nearby RFID tags will not be read. For example, range finder 28 can be configured to cooperate with display 24 such that indicia formed thereon delineate a predetermined threshold of the output power of the excitation beam of RFID reader 21.

Range finder 28 can be an active range finder, such as an ultrasonic range finder, a microwave range finder, or a laser range finder. Alternatively, range finder 2& can be a passive range finder such as a split view range finder. Such passive range finders are particularly suitable for use with all-optical imaging devices.

More particularly, range finder 28 can cooperate with display 24 to position cross-hairs 25, one of the circles 26 or 27, and/or a desired portion of a gradient at the 3 dB power boundary of a cross-section the excitation beam of RFID reader 21 in the plane of the image (in the area of the RFID tag). That is, display 24 can provide a visual representation of the power of the excitation beam of RFID reader 22.

For example, inner ring 26 can represent the 3 dB boundary. Inner ring 26 would then vary in size as the distance between imaging device 22 and the RFID tag changes, to reflect the changing size of the 3 dB boundary. An RFID tag within this boundary is much more likely to be read than an RFID tag outside of this boundary. Thus, in use the goal is to aim the RFID reader assembly 20 such that the desired RFID tag is within the boundary and all other RFID tags are outside of the boundary.

It is worthwhile to appreciate that the use of a 3 dB power boundary is by way of example only, and not by way of limitation. Other power or non-power boundaries may similarly be used. The level and/or pattern of the particular boundary used may be based upon the readability of a tag. The readability of a tag can depend upon the type of tag. For example, different types of tags typically have different antennas that can affect the readability thereof. Optionally, the user can select the level and/or pattern of the boundary to be displayed, such as by selecting the type of tag to be read.

Figure 3:
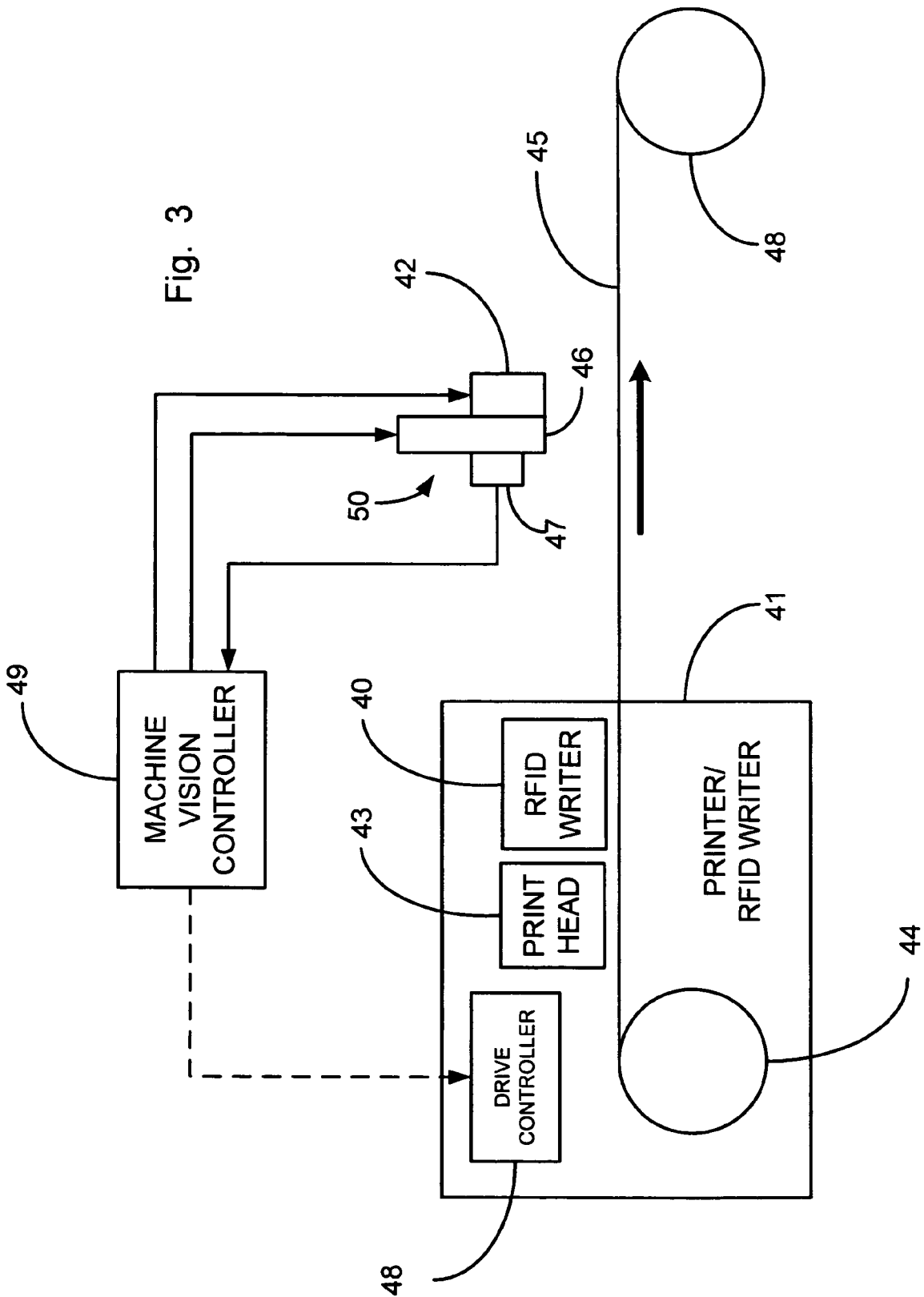
FIG. 3 is a block diagram of a representative manufacturing process that uses a stationary RFID reader, according to another embodiment of the present invention.
Figure 4:
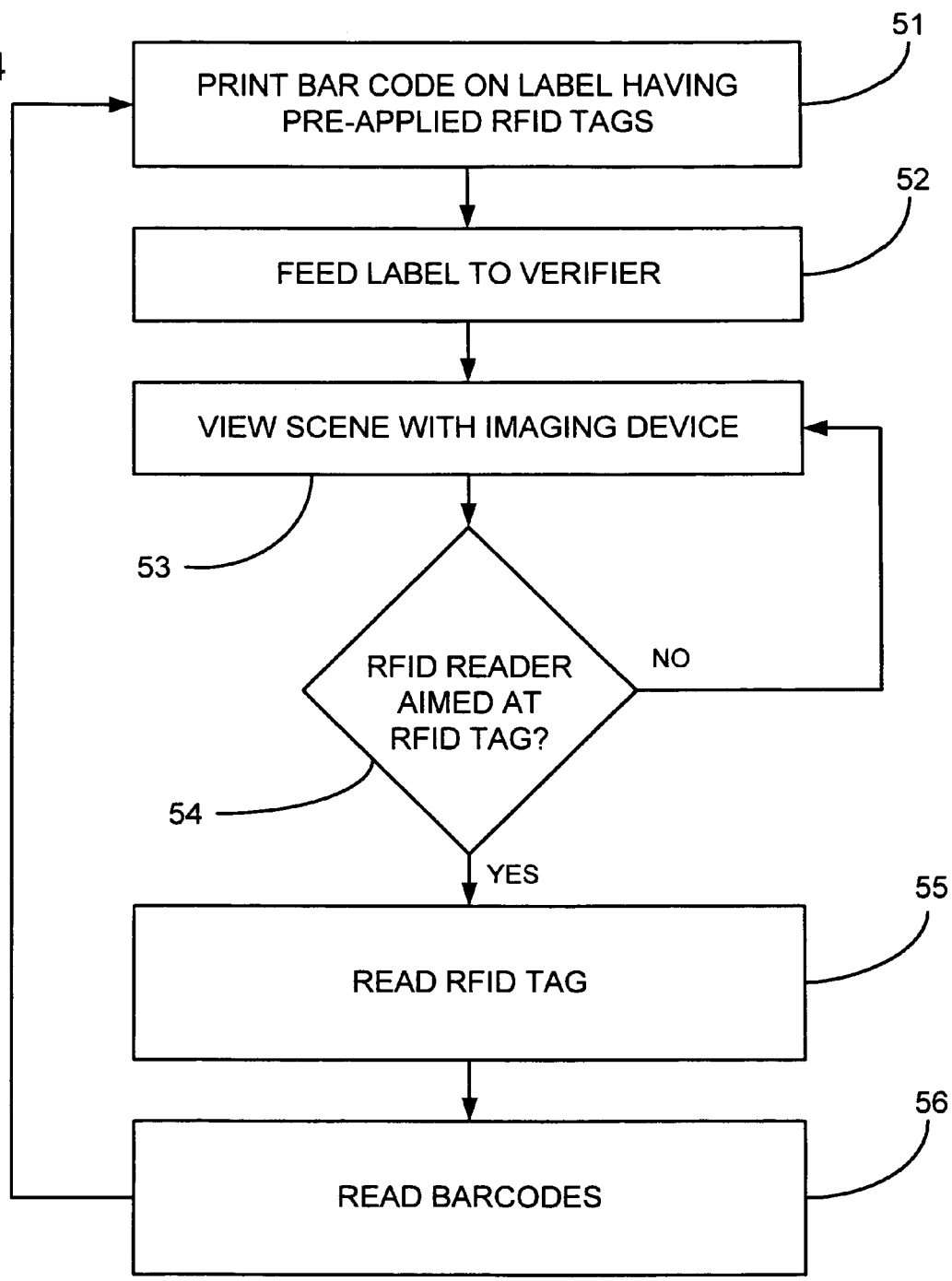
FIG. 4 is a flow chart showing the sequence of operation for the manufacturing process of FIG. 3.

Referring now to FIG. 3, another exemplary embodiment of the present invention is shown. In this exemplary embodiment, a stationary RFID reader assembly 50 is configured for stationary use, such as in an assembly or test line. Stationary RFID reader assembly 50 comprises a reader 46 having an imaging device 47 formed thereto. However, imaging device 47 can alternatively be separate from reader 46. Indeed, imaging device 47 can be disposed away from reader 46. For example, imaging device 47 can be several inches, or even several feet, away from reader 46. Imaging device 47 can generally be located anywhere that facilitates imaging of the RFID tags in a manner that enhances the ability of reader 46 to discriminate among adjacent RFID tags.

In this instance, stationary RFID reader assembly 50 is used in a manufacturing process to test RFID tags after bar codes have been printed onto labels that contain the RFID tags. Optionally, a bar code reader 42 can similarly be used to verify the printing process by checking the bar codes that were printed upon the labels. The use of imaging device 46 assures that both the proper RFID tag and the proper bar code are being read.

According to this exemplary manufacturing process, a printer/RFID writer 41 prints bar codes upon label stock 45 from supply reel 44. The printed labels are then wound onto take-up reel 48. Label stock 45 comprises a plurality of labels. Each label comprises an RFID tag. One or more bar codes can be printed upon each label. The labels can be placed upon the packages of goods that are to be shipped from a warehouse. For example, the RFID tag can contain a unique serial number, a product or model number, information regarding the product (such as its size, color, and included options), and an address to which it is to be shipped. The bar code(s), if used, can contain similar, though typically less, information. Alpha-numeric information (text) of at least an address can also be printed upon the label.

It is important to verify the accuracy and integrity of the RFID tags and/or the bar codes. The RFID tags and/or the bar codes are frequently used to route the package to its intended recipient. Thus, verifying the accuracy and integrity of the RFID tag and/or the bar codes can assure, among other things, that the printer/RFID writer 41 is functioning properly and that the package is likely to arrive at the intended location.

A printer/RFID writer 41 prints the bar codes upon the labels and programs the RFID tags. More particularly, a print head 43 of printer/RFID writer 41 prints the bar codes and any alpha-numeric information, while an RFID writer 40 writes the desired information to the RFID tag of the label.

Bar code reader 42 verifies the accuracy and integrity of bar codes printed upon the labels. Similarly, RFID reader 46 verifies the accuracy and integrity of RFID tags associated with the labels.

When verifying the accuracy and integrity of the bar codes and RFID tags, it is important to know which bar codes/RFID tags are being checked. Because the individual labels are close to one another on the label stock, it is possible to make mistakes regarding which labels are being read. This is particularly true for the RFID tags, since RFID reader 46 will typically be less directional than bar code reader 42.

Imaging device 47 images the labels that pass from supply reel 44 to take-up reel 48. A signal representative of the images made by imaging device 47 can be provided to machine vision controller 49. Machine vision controller 49 can be configured to recognize when a label is disposed beneath RFID reader 46 in a manner that mitigates the likelihood of inadvertently reading the RFID tag of an adjacent label.

Thus, machine vision controller 49 can determine when RFID reader 46 is to read a label. Machine vision controller 49 thus can provide a signal to RFID reader 46 that determines when RFID reader is to read an RFID tag. Similarly, machine vision controller 49 can provide a signal to bar code reader 42 that determines when bar code reader 42 is to read a bar code. Optionally, machine vision controller 49 can provide a control signal to a drive controller 48 of printer/RFID/writer 41 so as to control the movement of label stock 45 with respect to bar code reader 42 and/or RFID reader 46. Thus, according to one or more aspects of the present invention a way is provided for determining when an RFID reader is pointed toward a selected RFID tag, so as to mitigate the likelihood of inadvertently reading a wrong RFID tag.

Generally, a range finder is not needed in such industrial process applications because the distance between RFID reader 46 and the RFID tags is usually fixed. However, in applications where this distance is not fixed, a range finder may cooperate with machine vision controller to assure that the desired RFID tag is within a predetermined boundary, as discussed above. For example, a range finder may be used when scanning different sized boxes as they move on a conveyer belt, since the different sizes can define different ranges.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. An RFID reader assembly comprising:
   an RFID reader;
   an imaging device configured to facilitate aiming of the RFID reader at a selected RFID tag; and
   a vision controller coupled to the imaging device, wherein the vision controller is configured to send a signal, based on a signal received from the imaging device, to the RFID reader when the selected RFID tag is to be read.

2. The RFID reader assembly as recited in claim 1, wherein the imaging device is attached to the RFID reader.

3. The RFID reader assembly as recited in claim 1, wherein the imaging device is formed integrally with respect to the RFID reader.

4. The RFID reader assembly as recited in claim 1, wherein the imaging device is not attached to the RFID reader.

5. The RFID reader assembly as recited in claim 1, wherein the imaging device is located away from the RFID reader.

6. The RFID reader assembly as recited in claim 1, further comprising a range finder configured to facilitate providing an indication of when an RFID tag is within a predetermined boundary.

7. The RFID reader assembly as recited in claim 1, further comprising a display and a range finder configured to cooperate with the display to provide an indication of when an RFID tag is within a predetermined boundary by using indicia formed upon the display.

8. The RFID reader assembly in claim 1, further comprising a bar code reader, wherein the imaging device is configured to image a bar code and the vision controller is configured to send a second signal to the bar code reader when the bar code is to be read.

9. The RFID reader assembly of claim 1, further comprising a drive controller coupled to the vision controller, wherein the vision controller is configured to transmit a second signal to the drive controller for controlling the movement of the RFID tag.

10. A method for using an RFID reader, the method comprising:
    imaging an RFID tag with an imaging device; and
    transmitting a signal, based on a signal received from the imaging device, to the RFID reader indicating when to read the RFID tag.

11. The method as recited in claim 10, wherein transmitting a signal to the RFID reader comprises processing information with a machine vision controller.

12. The method as recited in claim 10, wherein transmitting a signal to the RFID reader comprises processing information with a machine vision controller, the machine vision controller providing a control signal that determine, at least in part, which RFID tag among a plurality of RFID tags that the RFID reader reads.

13. The method as recited in claim 10, wherein the imaging device is attached to the RFID reader.

14. The method as recited in claim 10, wherein the imaging device is not attached to the RFID reader.

15. The method of claim 10, further comprising transmitting an image signal from the imaging device to a controller, wherein the controller is configured to transmit the signal based on the image signal.

16. The method of claim 10, further comprising imaging a bar code and transmitting a second signal to a bar code reader when the bar code is to be read.

17. The method of claim 10, further comprising transmitting a second signal to a drive controller for controlling movement of the RFID tag.

18. The method of claim 10, wherein the tag is to be read when the tag begins to pass by the RFID reader.

19. The method of claim 16, wherein the bar code is to be read when the bar code begins to pass by the bar code reader.

20. A method for making an RFID reader assembly, the method comprising:
    providing an RFID reader;
    providing an imaging device;
    attaching the imaging device to the RFID reader, wherein the imaging device is configured to scan an image of an RFID tag; and
    coupling a vision controller to the imaging device, wherein the vision controller is configured to send a signal, based on a signal received from the imaging device, to the RFID reader when the selected RFID tag is to be read.

21. The method as recited in claim 20, further comprising attaching a display to the RFID reader, the display being configured to show an image from the imaging device.

22. The method as recited in claim 20, further comprising attaching a range finder to the RFID reader, the range finder being configured to facilitate the definition of a boundary that can be shown upon the display device.

23. The method of claim 20, further comprising providing a bar code reader, wherein the vision controller is configured to send a signal, based on a signal from the imaging device, to the bar code reader when a bar code is to be read.

24. The method of claim 20, further comprising providing a drive controller coupled to the vision controller, wherein the vision controller is configured to send a signal, based on a signal from the imaging device, to the drive controller to control the movement of the RFID tag.

25. An RFID reader assembly comprising:
an RFID reader;
an imaging device configured to facilitate aiming of the RFID reader at a selected RFID tag;
a vision controller coupled to the imaging device, wherein the vision controller is configured to send a signal to the RFID reader when the selected RFID tag is to be read; and
a range finder configured to facilitate providing an indication of when an RFID tag is within a predetermined boundary.

* * * * *